United States Patent
Yin et al.

(10) Patent No.: US 11,727,247 B2
(45) Date of Patent: Aug. 15, 2023

(54) MULTIMODAL WELL LOG INTERPRETATION USING DEEP LEARNING MODELS

(71) Applicant: International Business Machines Corporation, Armonk, NY (US)

(72) Inventors: Kun Yan Yin, Ningbo (CN); Qi Wang, Ningbo (CN); Jian Hui Chen, Ningbo (CN); Shu Zhang, Ningbo (CN); Yue Liu, Ningbo (CN)

(73) Assignee: International Business Machines Corporation, Armonk, NY (US)

(*) Notice: Subject to any disclaimer, the term of this patent is extended or adjusted under 35 U.S.C. 154(b) by 457 days.

(21) Appl. No.: 16/835,005

(22) Filed: Mar. 30, 2020

(65) Prior Publication Data
US 2021/0303965 A1  Sep. 30, 2021

(51) Int. Cl.
| | |
|---|---|
| *G06N 3/04* | (2023.01) |
| *E21B 49/00* | (2006.01) |
| *G06N 3/08* | (2023.01) |
| *G06N 3/045* | (2023.01) |

(52) U.S. Cl.
CPC ............. *G06N 3/04* (2013.01); *E21B 49/00* (2013.01); *G06N 3/045* (2023.01); *E21B 2200/20* (2020.05); *E21B 2200/22* (2020.05); *G06N 3/08* (2013.01)

(58) Field of Classification Search
None
See application file for complete search history.

(56) References Cited

U.S. PATENT DOCUMENTS

| | | | |
|---|---|---|---|
| 4,820,989 A | 4/1989 | Vail, III | |
| 10,400,590 B1* | 9/2019 | Aldred | E21B 49/00 |
| 2018/0232342 A1* | 8/2018 | Tong | G06F 40/111 |
| 2019/0034801 A1* | 1/2019 | Sodhani | G06N 20/10 |
| 2019/0034812 A1 | 1/2019 | Borrel | |
| 2019/0197396 A1* | 6/2019 | Rajkumar | G06N 3/08 |
| 2020/0104650 A1* | 4/2020 | Huang | G06V 10/82 |
| 2020/0124753 A1* | 4/2020 | Halsey | G06K 9/6232 |

FOREIGN PATENT DOCUMENTS

CN   110320557 A   10/2019

OTHER PUBLICATIONS

Bhatt, et al., "Determination of facies from well logs using modular neural networks", Petroleum Geoscience, vol. 8 2002, pp. 217-228, <https://www.researchgate.net/publication/275249542>.

(Continued)

*Primary Examiner* — Aaron M Richer
(74) *Attorney, Agent, or Firm* — Michael A. Petrocelli (57) ABSTRACT

A cognitive well log analysis using a computer includes receiving, by one or more processors, well log data from a plurality of well logs. One or more processors identify geometric features, specific values, and well attributes from the received well log data and embed the identified features to generate a plurality of intermediate vectors arranged based on a relevance for identifying petrophysical properties. The intermediate vectors are combined to create a fusion vector based on which the one or more processors identify reservoir layers.

20 Claims, 8 Drawing Sheets

(56) References Cited

OTHER PUBLICATIONS

Gosses, Justin, "Stratigraphic top prediction in well logs via machine-learning: Predictatops", Aug. 12, 2019, 13 pages, <https://medium.com/@justinGOSSES/https-medium-com-justingosses-stratigraphic-pick-prediction-via-supervised-machine-learning-predictatops-841cb5fc3elb>.

Gulbrandsen, Mats Lundh, "Quantitative geological modeling based on probabilistic integration of geological and geophysical data", Ph. D. Thesis, Niels Bohr Institute, Nov. 25, 2016, 191 pages, <https://www.researchgate.net/publication/313862488>.

Mell et al., "The NIST Definition of Cloud Computing", National Institute of Standards and Technology, Special Publication 800-145, Sep. 2011, 7 pages.

Nazlan, Dosh, "How to easily read a well log in 5 minutes or less using these Six Ko", Super Petrophysics 2020, 6 pages, <https://superpetrophysics.com/blog/8495/the-six-ko-ko-rules-for-well-log-interpretation>.

Qi, et al., "Neural network prediction of carbonate lithofacies from well logs, Big Bow and Sand Arroyo Creek fields, Southwest Kansas", Computers & Geosciences 32 (2006) 947-964, <https://www.sciencedirect.com/science/article/pii/S0098300405002396>.

Ross, E. R. (Ross), "Crain's Rules for Visual Analysis", Crain's Petrophysical Handbook, Last printed Mar. 3, 2020, 16 pages, <url=https://www.spec2000.net/01-crainsrules.htm>.

\* cited by examiner

MULTIMODAL WELL LOG INTERPRETATION USING DEEP LEARNING MODELS

BACKGROUND

The present invention generally relates to the field of artificial intelligence (AI), and more particularly to a cognitive method, system and computer program product for reservoir characterization using machine learning techniques and well log data.

The principal goal in oil and gas exploration is to gain an understanding of the distribution and nature of rocks and fluids in the subsurface. Well logs are records of petrophysical data acquired along a borehole that provide direct information about what is in the subsurface. The study of a formation surrounding the borehole in order to identify one or more properties of the rock type can be done, for example, by sound, electric current, electromagnetic waves or high energy nuclear particles. (e.g., gamma particles and neutrons). Geologists and engineers can use the collected well log data to determine the types of geological rock surrounding a well. The data collected by logging wells can have important economic consequences, due to the costs inherent to drilling wells, and the potential return of oil reservoirs. Typically, an expert in well log analysis establishes correlations and refine interpretations as well-log data is received to determine rock properties. Unfortunately, as the number of logs to be analyzed increases, well log interpretation can be a complex and time-consuming task. Therefore, improved techniques for well log analysis would be desirable.

SUMMARY

Shortcomings of the prior art are overcome and additional advantages are provided through the provision of a method using cognitive analysis for well log interpretation. The method includes receiving, by one or more processors, well log data from a plurality of well logs. Geometric features, specific values, and well attributes are identified by the one or more processors from the received well log data and embedded to generate intermediate vectors. The one or more processors arrange the intermediate vectors based on a relevance for identifying petrophysical properties and combines them to create a fusion vector based on which reservoir layers can be identified.

Another embodiment of the present disclosure provides a computer program product using cognitive analysis for well log interpretation, based on the method described above.

Another embodiment of the present disclosure provides a computer system using cognitive analysis for well log interpretation, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Well log analysis is a fundamental method for reservoir characterization that allows geologists, geoscientists and engineers to acquire more knowledge about the condition below the surface by determining physical properties of rocks. Well log analysis can be used to detect hydrocarbon bearing zones, calculate hydrocarbon volume, etc. by using well log data, a user may be able to calculate petrophysical properties such as shale volume ($V_{sh}$), water saturation ($S_w$), porosity ($\varphi$), permeability (k), elasticity ($\sigma$), reflectivity coefficient (R), and the like. Typically, the interpretation of well log data must be done in several steps, and preferably by experts in the field to avoid errors. Different methods exist for well log interpretation, being the most common manual interpretation and inversion of well log data. As mentioned above, as the number of well logs to be analyzed increases, well log interpretation becomes a challenging and time-consuming task. Additionally, reservoir complexity and mud invasion during drilling operations may further complicate the accurate estimation of petrophysical properties and reservoir markers from well log data.

Therefore, the following described exemplary embodiments provide a system, method, and computer program product to, among other things, automatically identify reservoir layers or stratigraphic markers based on relevant features including petrophysical properties and well characteristics acquired from multiple well logs using a multimodal deep learning model. Thus, the present embodiments have the capacity to improve the technical field of artificial intelligence by providing a cognitive approach for automatic classification and interpretation of a large volume of well logs for characterization of oil reservoirs.

Figure 1:
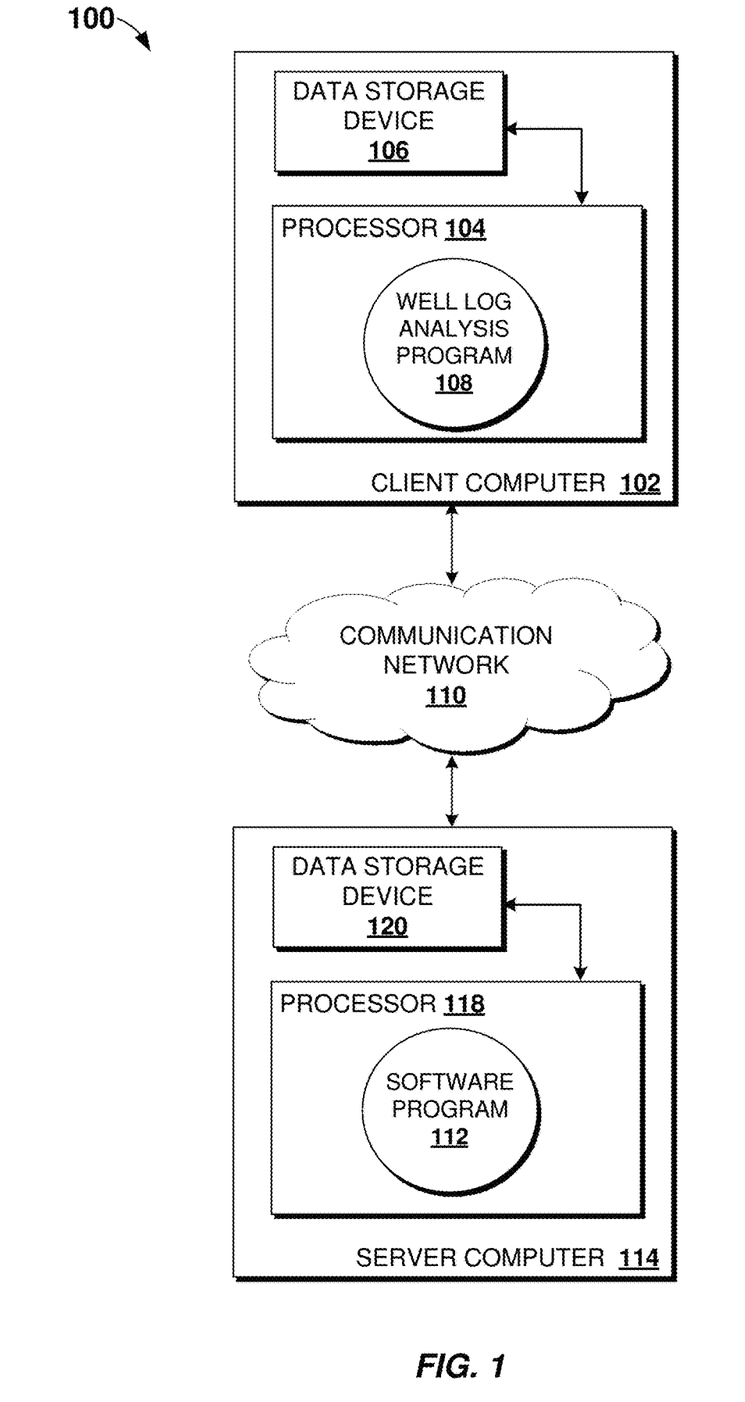
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104 and a data storage device 106 that is enabled to run a well log analysis program 108. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118 and a data storage device 120 that is enabled to run a software program 112. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The well log analysis program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2A:
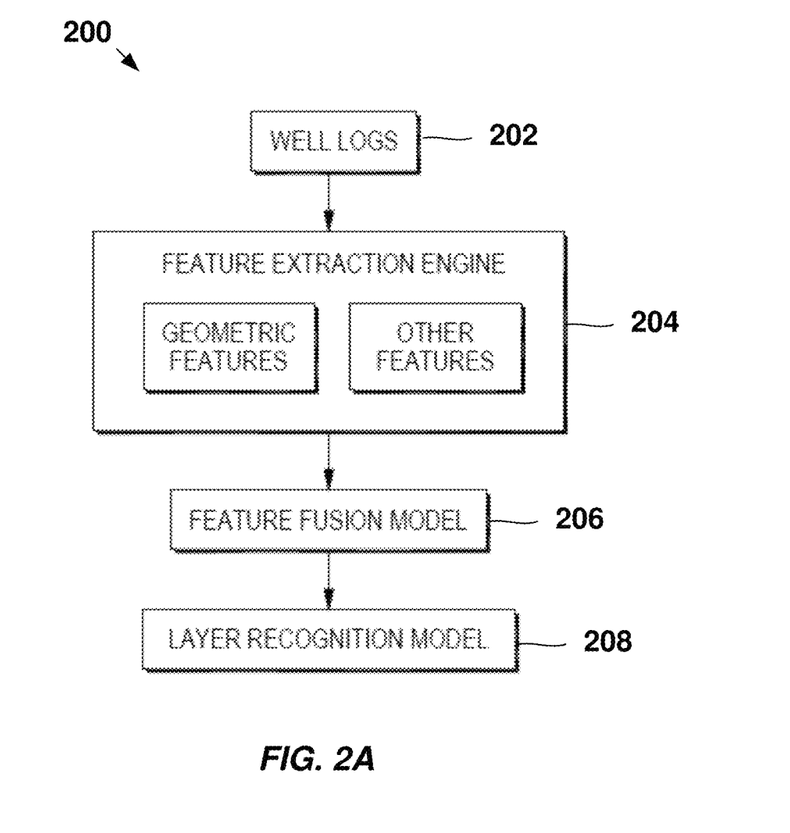
FIG. 2A is a block diagram depicting components of a system for cognitive well log analysis, according to an embodiment of the present disclosure.

Referring now to FIG. 2, a block diagram depicting components of a well log analysis system 200 capable of analyzing and classifying information from multiple log files for reservoir characterization is shown, according to an embodiment of the present disclosure. The well log analysis system 200 processes well log data from well logs 202 by implementing a feature extraction engine 204 followed by a feature fusion model 206 and finally a layer recognition model 208.

The feature extraction engine 204 receives and processes data from well logs 202. Particularly, the feature extraction engine 204 extracts, from the received well log data, geometric features associated with log attributes by implementing image processing and machine learning algorithms to identify key features from the well log data. Well log data from the well logs 202 may typically be presented as a .LAS file. However, in some cases, images can also be processed by the feature extraction engine 204.

According to an embodiment, some of the geometric features extracted from the well log data includes, for example, a number of log curves available within the log, a scale, a distance between different log curves, an area of log curves within specific segments, a gradient of each log curve, a variance of each log curve, and the like. As known by those skilled in the art, multiple log curves can be displayed in different tracks within a well log, for example, a combo including a plurality of the most commonly used measurements for estimating petrophysical properties in formation evaluation and wireline logging includes simultaneous displays of gamma-ray, neutron-porosity, resistivity, and spontaneous potential (SP) measurements presented as curves in different tracks.

Petrophysical properties can be estimated from one or more log curves in a combo log. For example, as known by those skilled in the art, areas within the log exhibiting low resistivity, low gamma ray and high spontaneous potential readings are typically associated with water bearing zones. Each of the aforementioned geometric features are identified and extracted by the feature extraction engine 204 from the combo log and send to the feature fusion model 206.

Additional features can be extracted by the feature extraction engine 204 and fed to the feature fusion model 206. For instance, specific values corresponding to properties such as rock type, grain size and/or bed thickness can also be extracted from the well logs 202. Further, additional features associated with well attribute (i.e., characteristics and operational parameters) can also be extracted from the well logs 202, particularly from the log header. For example, well name and location, well type and/or head size, logging company, name of the energy company (operator), type of logs recorded on a run, date of the logging operation, ground elevation (GL) and Kelly bushing elevation (KB), drill-bit size, drilling mud type, total depth according to the driller and logging engineer (TD), maximum or bottom-hole temperature (BHT), interval that was logged, drilling mud characteristics, among other operational and well characteristics.

In the feature fusion model 206 data associated with geometric features, specific values, and well attributes identified from the well logs 202 are converted to vector form. The process of converting the extracted features from the feature extraction engine 204 to vectors is performed by the feature fusion model 206 in three main steps shown in FIG. 2B. The first step includes embedding of extracted geometric features, specific values, and well attributes by a feature module 220. It should be noted that the feature embedding process is standard and well known in natural language processing (NLP) tasks. The second step is processing the embedded data by an attention mechanism 222, the attention mechanism 222 is capable of analyzing and converting the received data into different intermediate vectors, as shown in the figure. The attention mechanism 222 (FIG. 2B) assigns a weight to each intermediate vector according to a relevance or importance for determining different features.

Figure 2B:
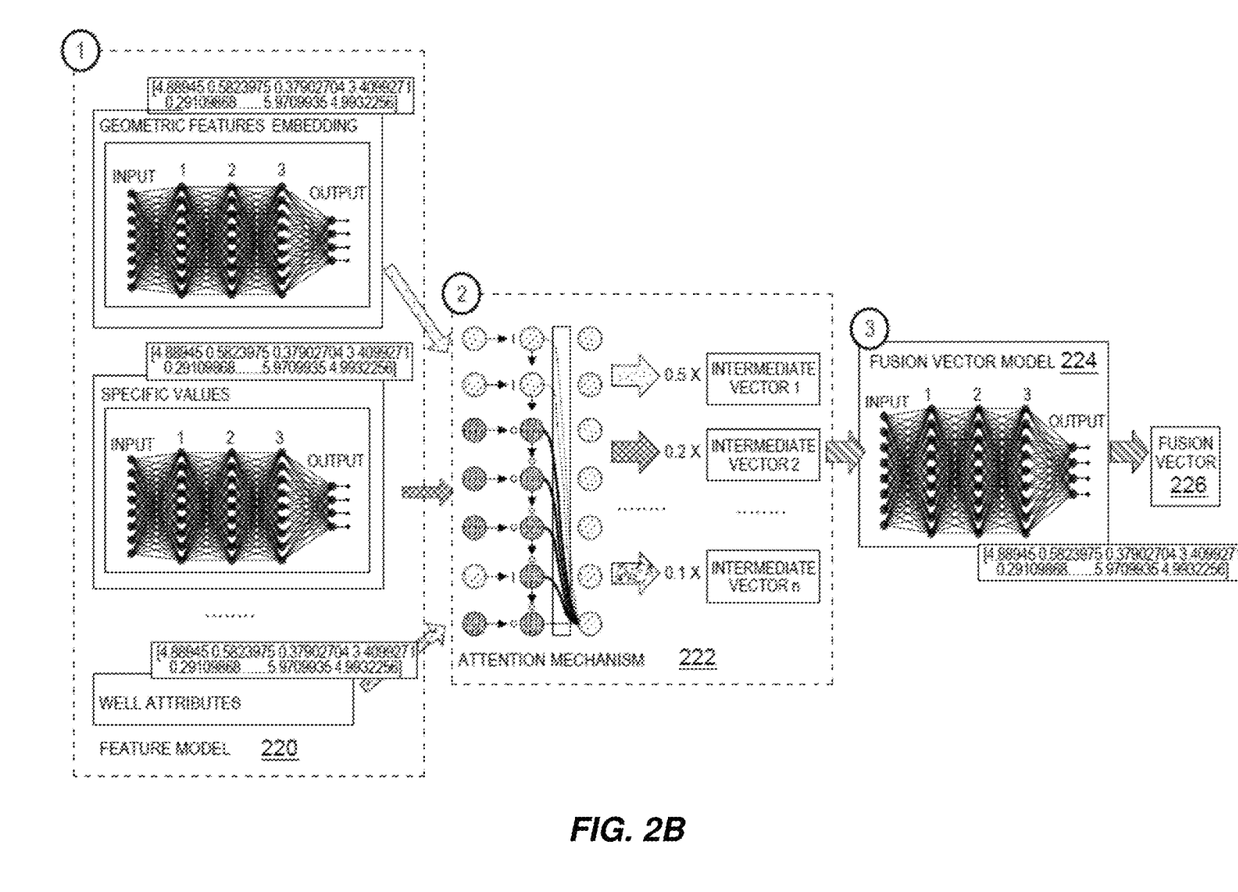
FIG. 2B is an exemplary implementation of a fusion module of the system for cognitive well log analysis, according to an embodiment of the present disclosure.

For example, once the feature extraction engine 204 determines geometric features (GF), specific values (SV) and well attributes (WA) from the well logs 202, a relationship can be established between reservoir layers and the data extracted by the feature extraction engine 204. In an exemplary embodiment, an intermediate vector [0.5*GF, 0.2*SV, 0.1*WA] associated with features of a reservoir layer can be obtained by the attention mechanism 222, and when a distance between the intermediate vector and a target vector is less than a predefined value, the feature fusion model 206 assumes that the reservoir layer has the same features.

The third, and final, step includes a fusion vector model 224 that receives the intermediate vectors from the attention mechanism 222 and combines them to create a fusion vector 226, as shown in FIG. 2B. The resulting fusion vector 226 combines the different features to reduce data dimension.

For instance, as previously explained, different intermediate vectors [a*GF(n), b*SV(m), c*WA(t)] can be obtained from the data extracted by the feature extraction engine 204. The relationship between these vectors and a reservoir layer (i.e., target layer) can only be verified using historic well log data such as existing well log data from neighboring wells. An intermediate vector within a specific confidence interval (e.g., 0.9) is selected and identified as the fusion vector by the well log analysis system 200. According to an embodiment, when new data is fetched for the reservoir layer, the fusion vector 226 can be used to test the new model and improve the prediction of reservoir properties for the target layer, as will be described below.

Figure 2C:
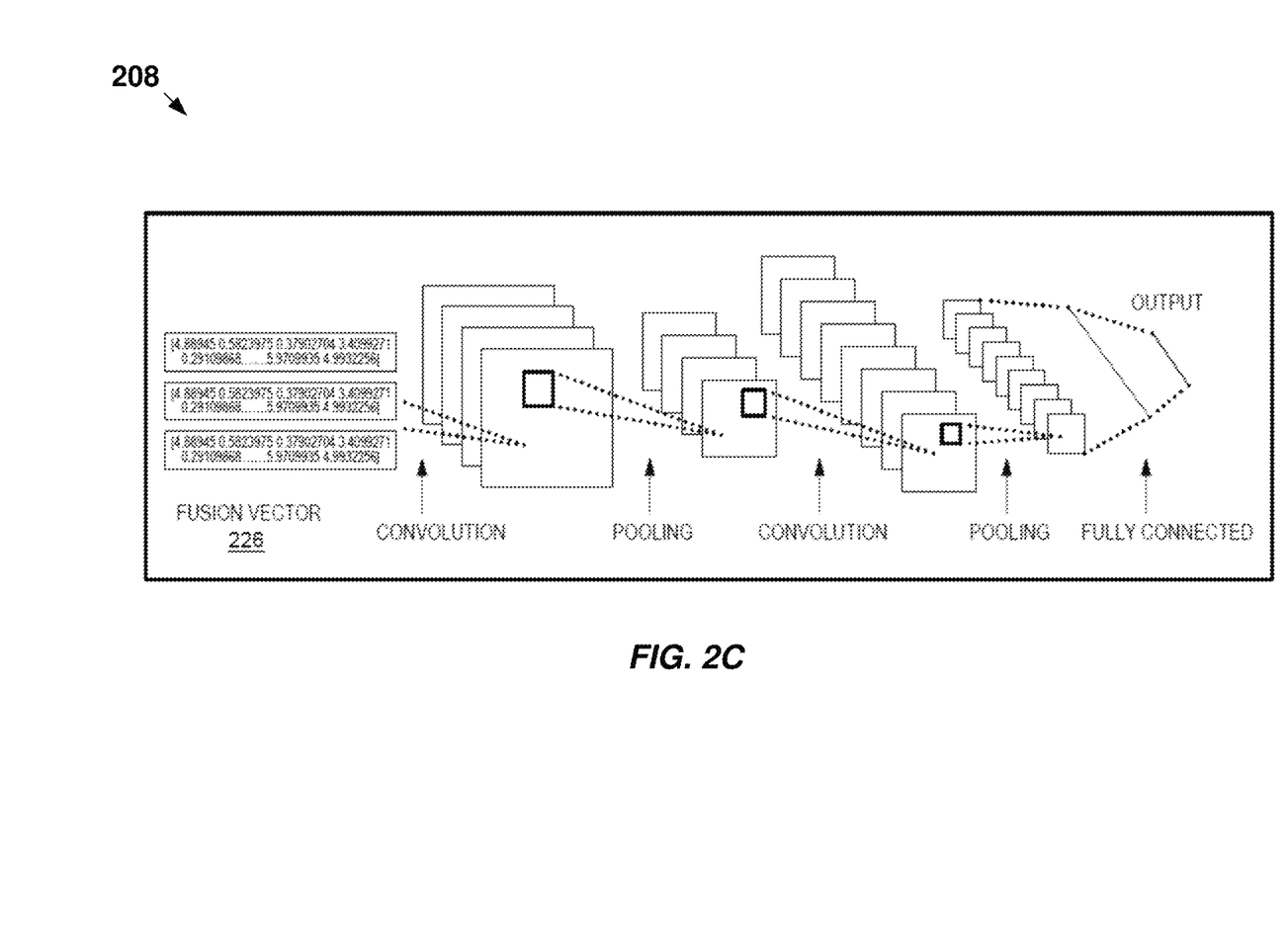
FIG. 2C is an exemplary implementation of a layer recognition module of the system for cognitive well log analysis, according to an embodiment of the present disclosure.

With continued reference to FIG. 2A, the fusion vector 226 from the feature fusion model 206 is used by a layer recognition model 208 to determine relevant petrophysical properties or parameters based on which different reservoir types can be identified. Stated differently, the layer recognition model 208 uses the fusion vector 226 to identify different stratigraphic layers from the processed well log data. The layer recognition model 208 is a classification model based on a convolutional neural networks (CNN) approach, as illustrated in FIG. 3C. As known by those skilled in the art, CNN is a class of deep learning neural networks for image recognition and classification capable of analyzing an input (i.e., image) and outputting a class or a probability that the input is a particular class.

According to an embodiment, the layer recognition model 208 is first trained using labeled well logs in which different reservoir layers have already been identified. After being trained, the layer recognition model 208 can be used to identified reservoir layers and associated properties.

Figure 3:
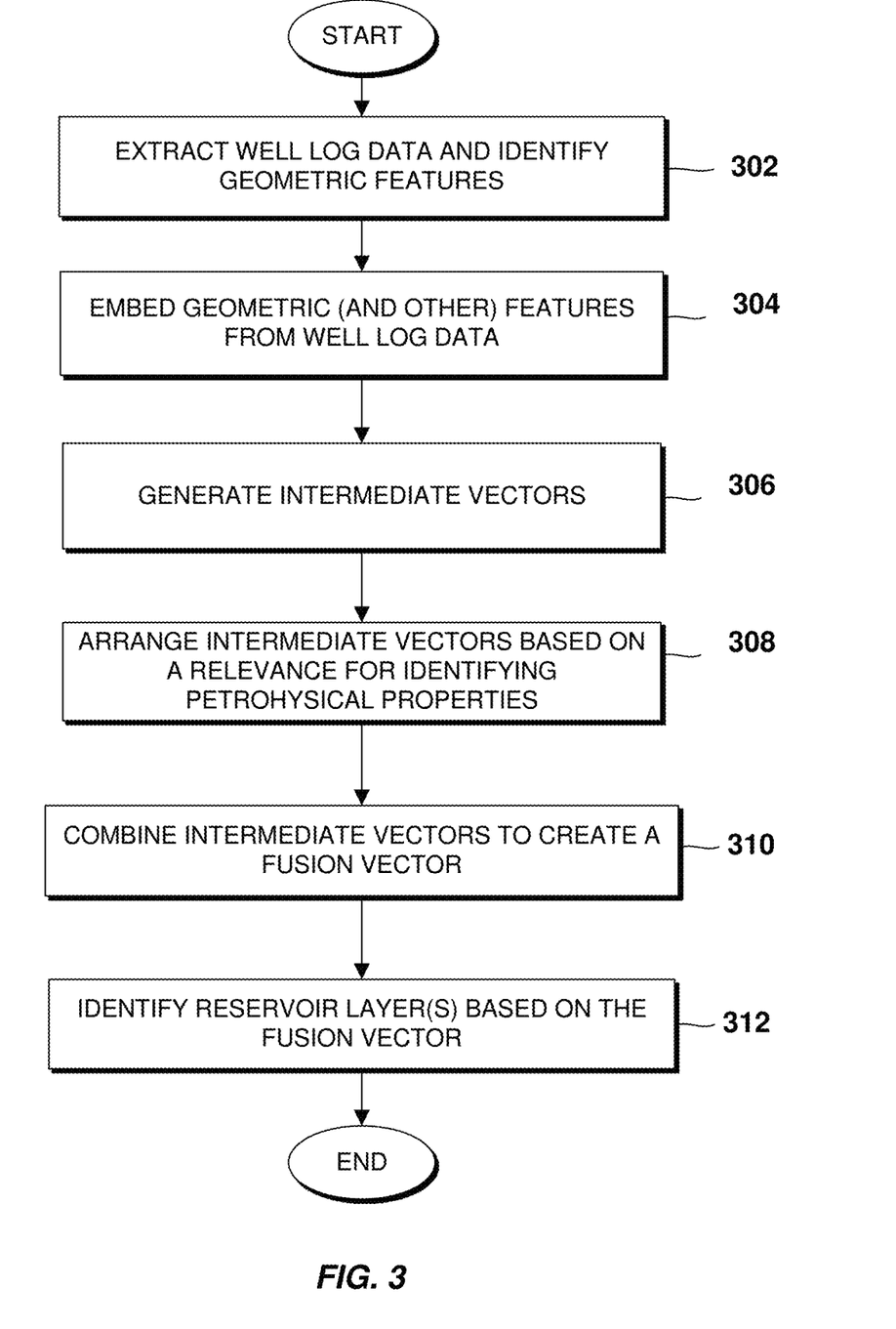
FIG. 3 is a flowchart illustrating the steps of a method for cognitive well log analysis, according to an embodiment of the present disclosure.

Referring now to FIG. 3, a flowchart illustrating the steps of a method for cognitive well log analysis is shown, according to an embodiment of the present disclosure. The well log analysis process starts at step 302 by receiving the well log data. As mentioned above, well log data may be typically received in a .LAS file format. However, well logs images may also be received and processed by implementing known image processing techniques. The received well log data is processed, using deep learning algorithms, to identify geometric features associated with the well logs and additional features corresponding to general well data.

At step 304, the identified geometric and additional features are embedded and used by the attention mechanism 222 (FIG. 2B) to generate intermediate vectors at step 306. At step 308, each intermediate vector is classified or arranged according to a relevance for identifying petrophysical properties and stratigraphic layers. At step 310, the intermediate vectors are composed or merged to create a fusion vector based on which different reservoir layers can be identified at step 312.

The described embodiments provide a cognitive method, system, and computer program product for automatic characterization of reservoirs from well log data. The proposed embodiments automatically determine stratigraphic layers and petrophysical properties from a plurality of well logs based on a multimodal deep learning approach that combines different log attributes with well and operational parameters to accurately determined reservoir characteristics. Additionally, by first training the proposed deep learning model, errors in well log interpretation can be reduced enhancing the accuracy in hydrocarbon zones detection. The proposed embodiments may also facilitate the process of well log interpretation of complex reservoirs to the less experience professionals.

Figure 4:
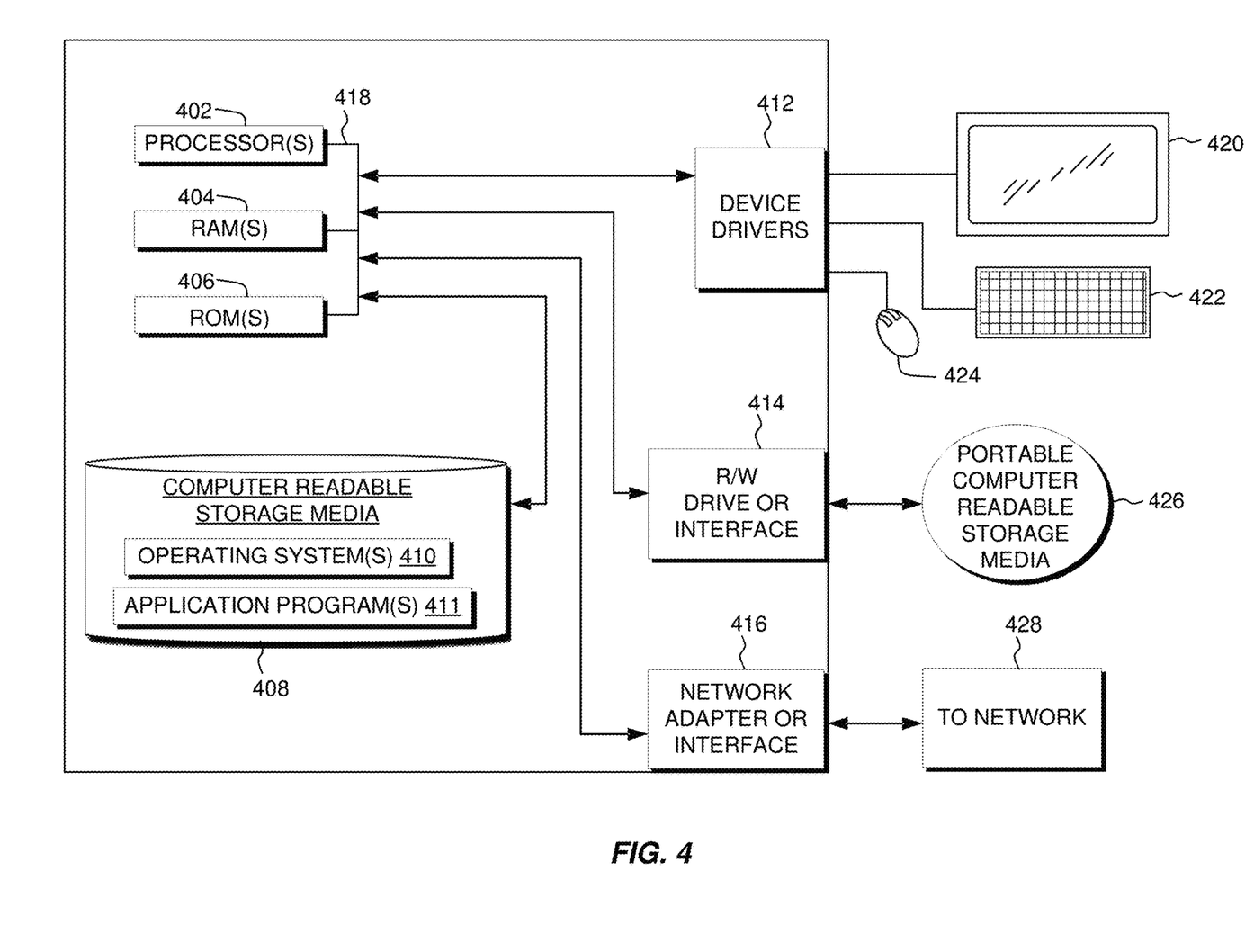
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
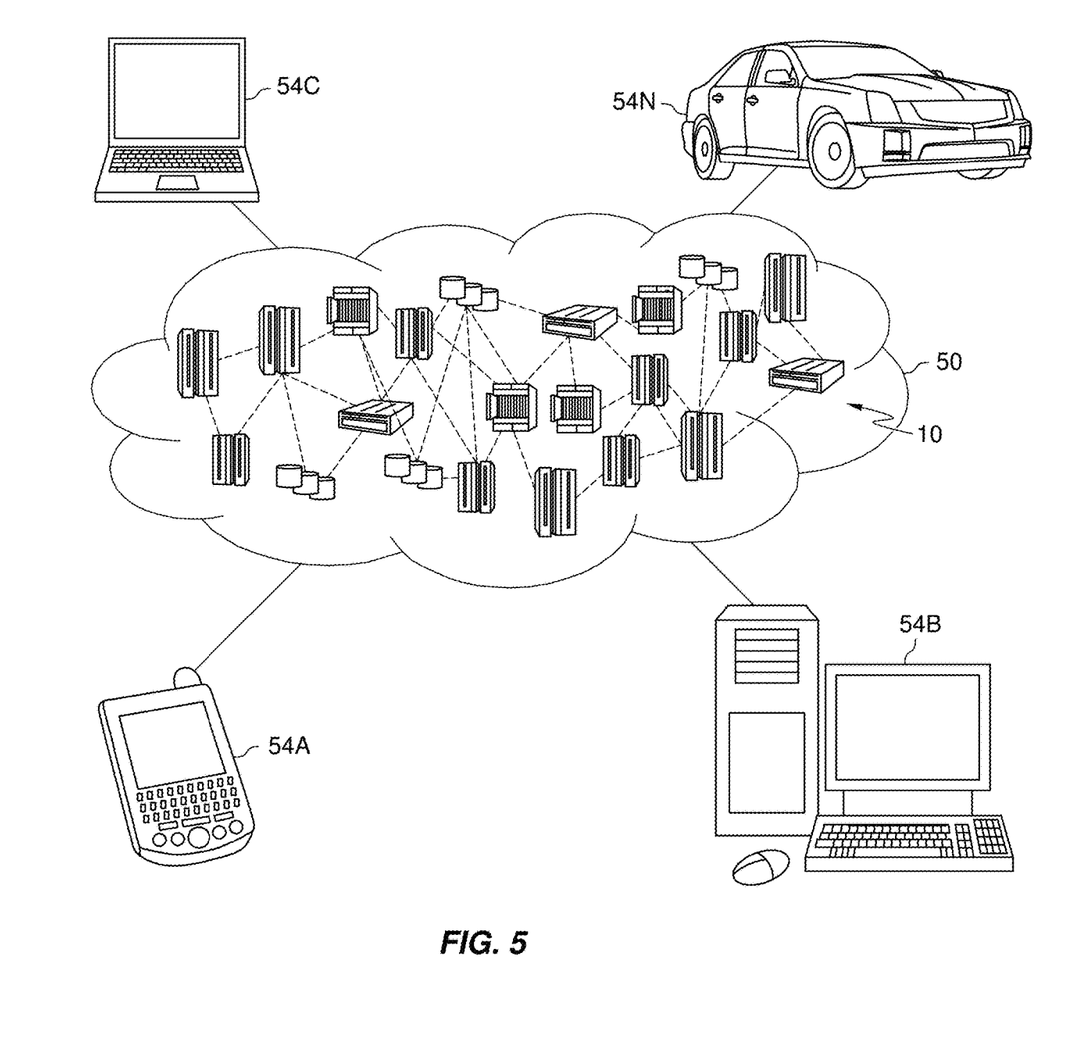
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
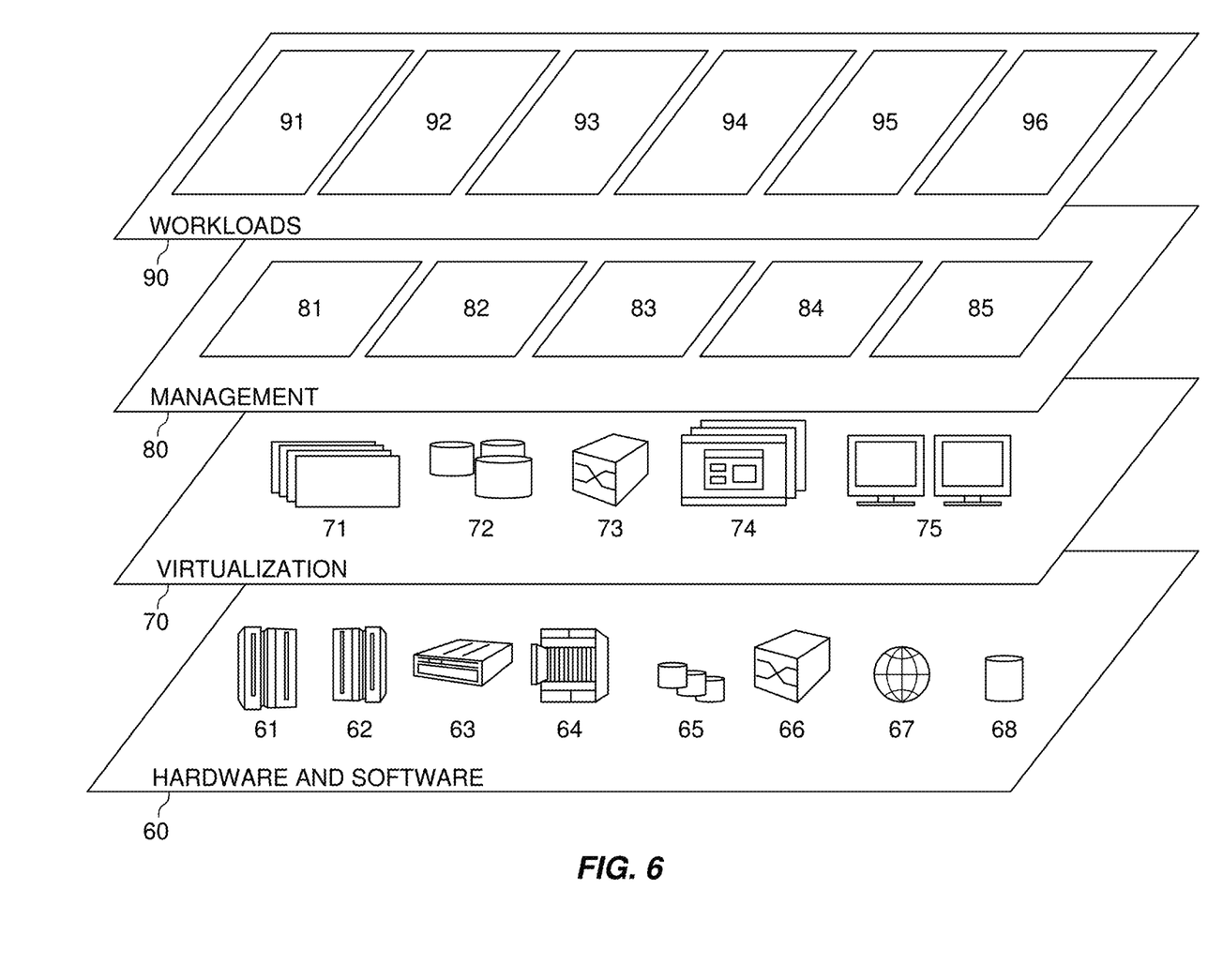
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for automatic intent recognition using multiple languages 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method using cognitive analysis for well log interpretation, comprising:
   receiving, by one or more processors, a plurality of well logs corresponding to one or more wells within an oilfield;
   extracting, by the one or more processors, well log data from the plurality of well logs, the extracted well log data comprising geometric features including characteristics of each log curve displayed on one or more tracks of the plurality of well logs, specific values associated with petrophysical properties measured by each of the plurality of well logs, and well attributes associated with well characteristics and operational parameters displayed on each of the plurality of well logs;
   embedding, by the one or more processors, the geometric features, the specific values and the well attributes;
   based on the embedded geometric features, specific values and well attributes, generating, by the one or more processors, intermediate vectors;
   assigning, by the one or more processors, a weight to each intermediate vector according to a relevance for identifying petrophysical properties and stratigraphic layers;
   determining, by the one or more processors, a correlation between the intermediate vectors and a target reservoir layer;
   based on a distance between an intermediate vector associated with the target reservoir layer and a target vector being less than a predefined value, assigning the geometric features, the specific values and the well attributes to the target reservoir layer; and responsive to the intermediate vector being within a confidence interval, selecting, by the one or more processors, the intermediate vector associated with the target reservoir layer as a fusion vector for determining hydrocarbon bearing zones.

2. The method of claim 1, wherein the characteristics of each log curve displayed in the one or more tracks of the plurality of well logs included in the geometric features are selected from the group consisting of a number of log curves available within the each of the plurality of well logs, a scale, a distance between different log curves, an area of the log curves within specific segments, a gradient of each log curve, and a variance of each log curve.

3. The method of claim 1, wherein the specific values comprise a rock type, a grain size and a bed thickness.

4. The method of claim 1, wherein the well attributes associated with the well characteristics and the operational parameters are selected from the group consisting of a well name and location, a well type and head size, a logging company, a name of an energy company, a type of logs recorded on a run, a date of a logging operation, a ground elevation and Kelly bushing elevation, a drill-bit size, a drilling mud type, a total depth according to driller and logging engineer, a bottom-hole temperature, an interval that was logged, and drilling mud characteristics.

5. The method of claim 1, wherein the plurality of well logs are received using at least one of a .LAS file and an image file.

6. The method of claim 1, wherein the plurality of well logs includes one or more of a gamma-ray log, a neutron-porosity log, a resistivity log, and a spontaneous potential log.

7. The method of claim 1, wherein identifying the reservoir layers based on the fusion vector is based on a convolutional neural networks approach.

8. A computer system using cognitive analysis for well log interpretation, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving, by one or more processors, a plurality of well logs corresponding to one or more wells within an oilfield;

extracting, by the one or more processors, well log data from the plurality of well logs, the extracted well log data comprising geometric features including characteristics of each log curve displayed on one or more tracks of the plurality of well logs, specific values associated with petrophysical properties measured by each of the plurality of well logs, and well attributes associated with well characteristics and operational parameters displayed on each of the plurality of well logs;

embedding, by the one or more processors, the geometric features, the specific values and the well attributes;

based on the embedded geometric features, specific values and well attributes, generating, by the one or more processors, intermediate vectors;

assigning, by the one or more processors, a weight to each intermediate vector according to a relevance for identifying petrophysical properties and stratigraphic layers;

determining, by the one or more processors, a correlation between the intermediate vectors and a target reservoir layer;

based on a distance between an intermediate vector associated with the target reservoir layer and a target vector being less than a predefined value, assigning the geometric features, the specific values and the well attributes to the target reservoir layer; and responsive to the intermediate vector being within a confidence interval, selecting, by the one or more processors, the intermediate vector associated with the target reservoir layer as a fusion vector for determining hydrocarbon bearing zones.

9. The computer system of claim 8, wherein the characteristics of each log curve displayed in the one or more tracks of the plurality of well logs included in the geometric features are selected from the group consisting of a number of log curves available within the each of the plurality of well logs, a scale, a distance between different log curves, an area of the log curves within specific segments, a gradient of each log curve, and a variance of each log curve.

10. The computer system of claim 8, wherein the specific values comprise a rock type, a grain size and a bed thickness.

11. The computer system of claim 8, wherein the well attributes associated with the well characteristics and the operational parameters are selected from the group consisting of a well name and location, a well type and head size, a logging company, a name of an energy company, a type of logs recorded on a run, a date of a logging operation, a ground elevation and Kelly bushing elevation, a drill-bit size, a drilling mud type, a total depth according to driller and logging engineer, a bottom-hole temperature, an interval that was logged, and drilling mud characteristics.

12. The computer system of claim 8, wherein the plurality of well logs are received using at least one of a .LAS file and an image file.

13. The computer system of claim 8, wherein the plurality of well logs includes one or more of a gamma-ray log, a neutron-porosity log, a resistivity log, and a spontaneous potential log.

14. The computer system of claim 8, wherein identifying the reservoir layers based on the fusion vector is based on a convolutional neural networks approach.

15. A computer program product using cognitive analysis for well log interpretation, comprising:

a computer readable storage medium having program instructions embodied therewith, wherein the computer readable storage medium is not a transitory signal per se, the program instructions executable by a device to cause the device to perform a method comprising:

receiving, by one or more processors, a plurality of well logs corresponding to one or more wells within an oilfield;

extracting, by the one or more processors, well log data from the plurality of well logs, the extracted well log data comprising geometric features including characteristics of each log curve displayed on one or more tracks of the plurality of well logs, specific values associated with petrophysical properties measured by each of the plurality of well logs, and well attributes associated with well characteristics and operational parameters displayed on each of the plurality of well logs;

embedding, by the one or more processors, the geometric features, the specific values and the well attributes;

based on the embedded geometric features, specific values and well attributes, generating, by the one or more processors, intermediate vectors;

assigning, by the one or more processors, a weight to each intermediate vector according to a relevance for identifying petrophysical properties and stratigraphic layers;

determining, by the one or more processors, a correlation between the intermediate vectors and a target reservoir layer;

based on a distance between an intermediate vector associated with the target reservoir layer and a target vector being less than a predefined value, assigning the geometric features, the specific values and the well attributes to the target reservoir layer; and responsive to the intermediate vector being within a confidence interval, selecting, by the one or more processors, the intermediate vector associated with the target reservoir layer as a fusion vector for determining hydrocarbon bearing zones.

16. The computer program product of claim 15, wherein the characteristics of each log curve displayed in the one or more tracks of the plurality of well logs included in the geometric features are selected from the group consisting of a number of log curves available within the each of the plurality of well logs, a scale, a distance between different log curves, an area of the log curves within specific segments, a gradient of each log curve, and a variance of each log curve.

17. The computer program product of claim 15, wherein the specific values comprise a rock type, a grain size and a bed thickness.

18. The computer program product of claim 15, wherein the well attributes associated with the well characteristics and the operational parameters are selected from the group consisting of a well name and location, a well type and head size, a logging company, a name of an energy company, a type of logs recorded on a run, a date of a logging operation, a ground elevation and Kelly bushing elevation, a drill-bit size, a drilling mud type, a total depth according to driller and logging engineer, a bottom-hole temperature, an interval that was logged, and drilling mud characteristics.

19. The computer program product of claim 15, wherein the plurality of well logs are received using at least one of a .LAS file and an image file.

20. The computer program product of claim 15, wherein the plurality of well logs includes one or more of a gamma-ray log, a neutron-porosity log, a resistivity log, and a spontaneous potential log.

* * * * *